US006776185B2

(12) United States Patent
Farrar et al.

(10) Patent No.: US 6,776,185 B2
(45) Date of Patent: Aug. 17, 2004

(54) GROUNDED JET PUMP ASSEMBLY FOR FUEL SYSTEM

(75) Inventors: Robert L. Farrar, Flint, MI (US); Chris I. Witherspoon, Clarkston, MI (US); Anthony P. Nedella, Davison, MI (US)

(73) Assignee: Delphi Technologies, Inc., Troy, MI (US)

( * ) Notice: Subject to any disclaimer, the term of this patent is extended or adjusted under 35 U.S.C. 154(b) by 87 days.

(21) Appl. No.: 10/189,958

(22) Filed: Jul. 3, 2002

(65) Prior Publication Data

US 2004/0003851 A1 Jan. 8, 2004

(51) Int. Cl.[7] ............................ F03B 5/00; F16D 31/02

(52) U.S. Cl. ............ 137/560; 137/565.22; 137/565.37; 137/549; 123/509; 417/151

(58) Field of Search ....................... 137/565.17, 565.37, 137/565.22, 549; 123/509; 417/151, 360

(56) References Cited

U.S. PATENT DOCUMENTS

| | | | | |
|---|---|---|---|---|
| 4,318,075 A | | 3/1982 | Pudelko et al. | 338/162 |
| 5,642,718 A | | 7/1997 | Nakai et al. | 123/497 |
| 5,746,088 A | | 5/1998 | Sawert et al. | 73/317 |
| 5,785,032 A | | 7/1998 | Yamashita et al. | 123/509 |
| 6,021,668 A | | 2/2000 | Sawert et al. | 73/313 |
| 6,047,685 A | * | 4/2000 | Schelhas et al. | 123/510 |
| 6,168,713 B1 | | 1/2001 | Sekine et al. | 210/172 |
| 6,206,035 B1 | | 3/2001 | Wehner et al. | 137/565.16 |
| 6,216,671 B1 | | 4/2001 | Sawert et al. | 123/509 |
| 6,382,190 B1 | * | 5/2002 | Tanabe et al. | 123/509 |
| 6,453,870 B1 | * | 9/2002 | Koller et al. | 123/509 |
| 6,505,644 B2 | * | 1/2003 | Coha et al. | 137/565.22 |
| 2002/0124833 A1 | | 9/2002 | Fauser et al. | 123/509 |

FOREIGN PATENT DOCUMENTS

| | | |
|---|---|---|
| WO | WO 00/60231 | 10/2000 |

* cited by examiner

*Primary Examiner*—A. Michael Chambers
(74) *Attorney, Agent, or Firm*—Jimmy L. Funke

(57) ABSTRACT

A grounded jet pump assembly for a fuel system of a vehicle includes a fuel reservoir and a grounded fuel component disposed in the fuel reservoir. The grounded jet pump assembly also includes a jet pump having an outlet extending into the fuel reservoir and a grounding member at the outlet of the jet pump for contacting flow of fuel from the jet pump and contacting the grounded fuel component to complete an electrical circuit for grounding the jet pump.

20 Claims, 1 Drawing Sheet

GROUNDED JET PUMP ASSEMBLY FOR FUEL SYSTEM

TECHNICAL FIELD

The present invention relates generally to fuel systems for vehicles and, more particularly, to a grounded jet pump assembly for a fuel system of a vehicle.

BACKGROUND OF THE INVENTION

It is known to provide a fuel system for a vehicle, which typically includes a fuel delivery module, a fuel filter, a fuel pressure regulator, a jet pump, a fuel rail, and fuel injectors. As the volatility of fuels has been decreased by government regulations, it has become necessary to provide a mechanism of dissipating charges which can develop in a fuel system as a result of fuel flow or movement of fuel within the fuel system under some environmental conditions. As a result, the jet pump and/or fuel delivery module must be grounded for proper operation. Typically, small electrical wiring harnesses have been used, which require highly labor intensive assembly methods or utilize expensive conductive plastics that have no fuel system exposure history.

Therefore, it is desirable to provide a new grounding member for a jet pump of a fuel delivery module in a fuel system for a vehicle. It is also desirable to provide a grounded jet pump for a fuel system of a vehicle that eliminates small electrical wiring harnesses and reduces assembly. It is further desirable to provide a grounded jet pump that is relatively low cost. Therefore, there is a need in the art to provide a grounded jet pump assembly for a fuel system that meets these desires.

SUMMARY OF THE INVENTION

It is, therefore, one object of the present invention to provide a grounded jet pump assembly for a fuel system of a vehicle.

It is another object of the present invention to provide a grounded jet pump in a fuel delivery module for a fuel system of a vehicle that is relatively low cost.

To achieve the foregoing objects, the present invention is a grounded jet pump assembly for a fuel system of a vehicle including a fuel reservoir and a grounded fuel component disposed in the fuel reservoir. The grounded jet pump assembly also includes a jet pump having an outlet extending into the fuel reservoir and a grounding member at the outlet of the jet pump for contacting flow of fuel from the jet pump and contacting the grounded fuel component to complete an electrical circuit for grounding the jet pump.

One advantage of the present invention is that a grounded jet pump assembly is provided for a fuel system of a vehicle. Another advantage of the present invention is that the grounded jet pump assembly utilizes proven electrical connection methods. Yet another advantage of the present invention is that the grounded jet pump assembly uses a less expensive means of providing grounding than using a conductive plastic for the jet pump, reservoir, and retainer. Still another advantage of the present invention is that the grounded jet pump assembly eliminates the use of conductive plastic or conductive coatings over the components and has less material changeover for the plastic mold area.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
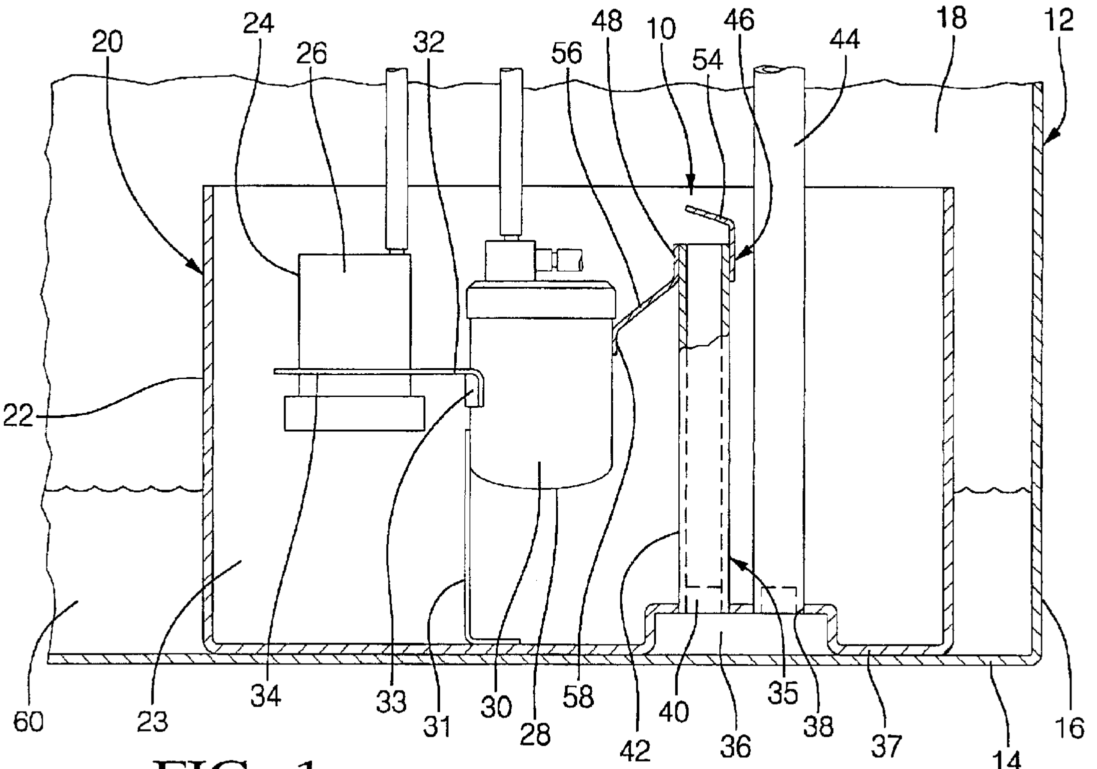
FIG. 1 is an elevational view of a grounded jet pump assembly, according to the present invention, illustrated in operational relationship with a fuel tank.

Referring to the drawings and in particular FIG. 1, one embodiment of a grounded jet pump assembly 10, according to the present invention, is shown for a fuel system (not shown) of a vehicle (not shown). The grounded jet pump assembly 10 is used with a fuel tank, generally indicated at 12, to hold liquid fuel. In this embodiment, the fuel tank 12 includes a bottom or base wall 14 and a side wall 16 around a periphery of the base wall 14 and extending generally perpendicular thereto. The fuel tank 12 also includes a top wall (not shown) extending generally perpendicular to the side wall 16 to form an interior chamber 18 to hold fuel. The fuel tank 12 is made of a rigid material, preferably a plastic material. It should be appreciated that the fuel tank 12 could be made of a metal material such as steel.

Referring to FIG. 1, a fuel delivery module, generally indicated at 20, is disposed in the interior chamber 18 and delivers fuel from the fuel tank 12 to an engine (not shown) of the vehicle. The fuel delivery module 20 includes a fuel reservoir 22 having a chamber 23 and an electrical fuel pump 24 mounted therein. The fuel reservoir 22 is made of a non-conductive material. The fuel pump 24 has a metal shell 26 attached to an internal electrical ground (not shown) therein. It should be appreciated that the fuel reservoir 22 and fuel pump 24 are conventional and known in the art.

The fuel delivery module 20 includes a cover (not shown) to close an opening (not shown) in the top wall of the fuel tank 12. The cover includes an electrical connector (not shown) and fuel tubes (not shown) connected to the cover. The cover is made of a metal material. It should be appreciated that the cover is electrically grounded by fuel lines (not shown) connected to the fuel tubes of the cover.

The fuel delivery module 20 further includes a pump harness (not shown) electrically connected to the electrical connector and the fuel pump 24. It should be appreciated that the fuel pump 24 is electrically connected and grounded to a vehicle electrical system (not shown) through the pump harness and the electrical connector.

The fuel delivery module 20 includes other conductive/dissipative fuel components disposed in the fuel reservoir 22. In the embodiment illustrated in FIG. 1, the fuel delivery module 20 includes a fuel filter 28 disposed in the fuel reservoir 22. The fuel filter 28 has a metal shell 30. The fuel delivery module 20 includes a retainer 31 disposed in the fuel reservoir 22 and connected to the shell 30 of the fuel filter 28 by suitable means. The fuel delivery module 20 includes a grounding member or strap 32 having a first end 33 contacting the shell 30 of the fuel filter 28 and a second end 34 contacting the shell 26 of the fuel pump 24. It should be appreciated that all fuel components are grounded as long as there is a ground through the fuel pump 24.

Figure 2:
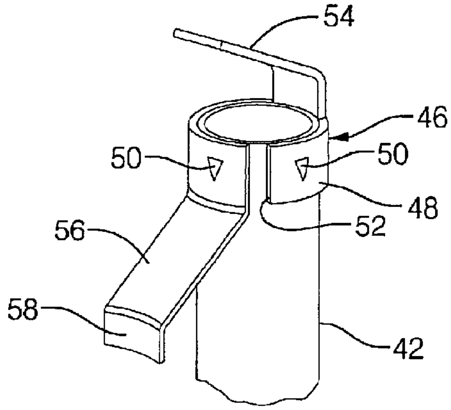
FIG. 2 is a perspective view of a portion of the grounded jet pump assembly of FIG. 1.
Figure 3:
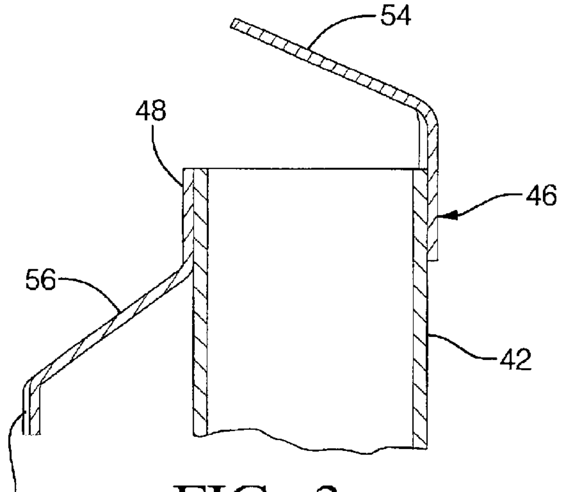
FIG. 3 is an enlarged fragmentary elevational view of a portion of the grounded jet pump assembly of FIG. 1.

Referring to FIGS. 1 through 3, the fuel delivery module 20 includes the grounded jet pump assembly 10, according to the present invention, disposed in the fuel reservoir 22. The grounded jet pump assembly 10 includes a jet pump, generally indicated at 35, to pump fuel into the fuel reservoir 22. The jet pump 35 includes a jet pump member 36 extending upwardly from a bottom portion 37 of the fuel reservoir 22. The jet pump member 36 is tubular and has a generally circular cross-sectional shape. The jet pump member 36 has an inlet 38 and an outlet 40 extending therefrom. The jet pump member 36 is integral and preferably formed as one-piece. It should be appreciated that the jet pump member 36 extends into the chamber 23 of the fuel reservoir 22.

The jet pump 35 also includes a jet pump barrel member 42 extending upwardly from the jet pump member 36. The jet pump barrel member 42 is tubular and has a generally circular cross-sectional shape. The jet pump barrel member 42 is connected to the outlet 40 of the jet pump member 36. The jet pump 35 also includes a conduit 44 connected to the inlet 38 of the jet pump member 36 and extending through the cover for connection to an engine (not shown) of the vehicle. It should be appreciated that the jet pump barrel member 42 extends into the chamber 23 of the fuel reservoir 22. It should also be appreciated that the fuel reservoir 22 holds fuel and is filled by fuel coming out of the jet pump barrel member 42. It should further be appreciated that the jet pump barrel member 42 is sized both in diameter and height to optimize its functions.

Referring to FIGS. 2 and 3, the grounded jet pump assembly 10 includes a grounding member or clip 46 disposed in the fuel reservoir 22 and cooperating with the jet pump 35. The grounding member 46 has a base 48 that is generally circular in shape. The base 48 has at least one, preferably a plurality of one-way barbs 50 extending radially therefrom and spaced circumferentially thereabout. The base 48 is also non-continuous or split to form a gap 52 to allow the base 48 to flex and be disposed about the outlet of the jet pump barrel member 42. The barbs 50 engage the outer surface of the jet pump barrel member 42 to retain the base 48 thereto. The grounding member 46 also has a first leg 54 extending upwardly and at angle over the base 48. The first leg 54 extends over the outlet of the jet pump barrel member 42 to contact fuel exiting the outlet of the jet pump barrel member 42. The grounding member 46 has a second leg 56 extending downwardly and outwardly away from the base 48. The grounding member 46 has a flange 58 extending downwardly from a free end of the second leg 56 to contact the shell 30 of the fuel filter 28. The flange 48 has a generally arcuate shape to match the generally arcuate shape of the shell 30. The grounding member 46 is made of a conductive material such as metal or a conductive plastic. The grounding member 46 is a monolithic structure being integral, unitary, and one-piece. It should be appreciated that the first and second legs 54 and 56 are deflectable.

In operation, the grounded jet pump assembly 10 is illustrated in an assembled state in FIG. 1 in which fuel 60 is disposed in the fuel tank 12 as illustrated in FIG. 1. Fuel from the engine returns via the conduit 44 to the inlet 38 of the jet pump member 36. Fuel flows through the jet pump member 36 and exits the outlet 40 into the jet pump barrel member 42. Fuel flows through the jet pump barrel member 42 and exits the outlet thereof to impinge on the first leg 54 and into the chamber 23 of the fuel reservoir 22 to fill the fuel reservoir 22. The grounding member 46, which is disposed in the fuel reservoir 22 and over the outlet of the jet pump barrel member 42, is electrically charged by the fuel impinging thereon. This electrical charge is carried away to the fuel filter 28 by having the second leg 56 of the grounding member 46 in intimate contact with the shell 30 of the fuel filter 28. The shell 30 of the fuel filter 28 is made of a conductive material such as metal or conductive plastic. When this happens, an electrical connection is made between the fuel filter 28 and jet pump 35, grounding the components. The barbs 50 of the base 48 grip the outer surface of the jet pump barrel member 42 to prevent the grounding member 46 from disengaging the jet pump 35. The grounding member 46 is pressed over the outlet of the jet pump barrel member 42 for minimal assembly time. It should be appreciated that the shell 28 of the fuel filter 28 is electrically connected to the shell 26 of the fuel pump 24 by the grounding member 32, and the shell 26 is electrically connected, internal to the fuel pump 24, with the ground terminal of the fuel pump 24. It should also be appreciated that the grounding member 46 completes an electrical circuit used for grounding of the jet pump 35 in contact therewith and electrically connected to the shell 28 of the fuel filter 28, which is electrically connected to the shell 26 of the fuel pump 24. It should further be appreciated that output flow of the jet pump 35 impinges on the conductive feature of the grounding member 46.

Figure 4:
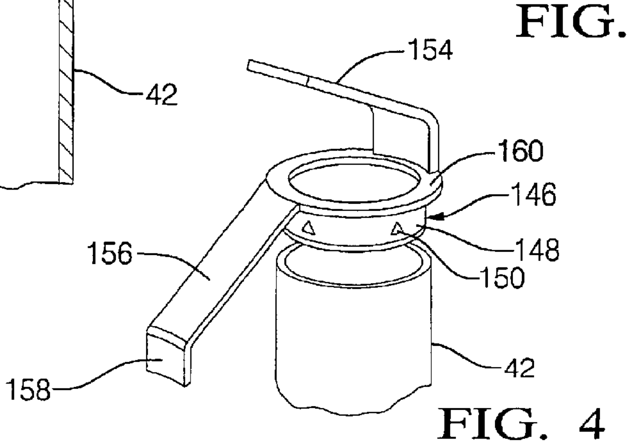
FIG. 4 is a perspective view of another embodiment, according to the present invention, of a grounding member of the grounded jet pump assembly of FIG. 1.

Referring to FIG. 4, another embodiment, according to the present invention, of the grounding member 46 is shown. Like parts of the grounding member 46 have like reference numerals increased by one hundred (100). In this embodiment, the grounding member 146 has a flange 162 extending radially outwardly from an upper end of the base 148. The first leg 154 and second leg 156 extend from the flange 162. The base 148 is of a diameter less than a diameter the flange 162 to allow the base 148 to be disposed within the outlet of the jet pump barrel member 142. The barbs 150 on the base 148 engage the inner surface of the jet pump barrel member 142 to retain the grounding member 146 to the jet pump barrel member 142. The operation of the grounding member 146 is similar to the grounding member 46.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A grounded jet pump assembly for a fuel system of a vehicle comprising:

a fuel reservoir;

a grounded fuel component disposed in said fuel reservoir;

a jet pump having a barrel with an outlet extending upwardly into a chamber of said fuel reservoir; and a grounding member at the outlet of said jet pump for contacting flow of fuel from said jet pump and contacting said grounded fuel component to complete an electrical circuit for grounding said jet pump.

2. A grounded jet pump assembly as set forth in claim 1 wherein said grounding member is made of a conductive material.

3. A grounded jet pump assembly as set forth in claim 1 including a fuel pump having a shell made of a conductive material, said fuel pump being disposed in said fuel reservoir and adapted to be electrically grounded to an electrical system of the vehicle.

4. A grounded jet pump assembly as set forth in claim 3 wherein said grounded fuel component is a fuel filter having a shell made of a conductive material.

5. A grounded jet pump assembly as set forth in claim 4 including a second grounding member extending between said shell of said fuel pump and said shell of said fuel filter.

6. A grounded jet pump assembly for a fuel system comprising:

a fuel reservoir;

a grounded fuel component disposed in said fuel reservoir;

a jet pump having an outlet extending into said fuel reservoir;

a grounding member at the outlet of said jet pump for contacting flow of fuel from said jet pump and contacting said grounded fuel component to complete an electrical circuit for grounding said jet pump; and wherein said grounding member has a base and a first leg extending upwardly and inwardly at an angle from said base and a second leg extending downwardly and outwardly at an angle from said base.

7. A grounded jet pump assembly as set forth in claim 6 wherein said second arm has a flange extending downwardly from said second leg to contact said grounded fuel component.

8. A grounded jet pump assembly as set forth in claim 6 wherein said base has at least one barb for engaging said jet pump.

9. A grounded jet pump assembly as set forth in claim 6 wherein said base is generally circular and split to form a gap between ends thereof.

10. A grounded jet pump assembly as set forth in claim 6 wherein said base has a flange extending radially therefrom with a diameter greater than a diameter of said base.

11. A grounded fuel delivery module comprising:

a fuel reservoir adapted to be disposed in an interior chamber of a fuel tank;

a fuel filter made of a conductive material disposed in said fuel reservoir;

a jet pump disposed in said fuel reservoir and having a barrel extending upwardly into the interior chamber of said fuel reservoir; and a grounding member made of a conductive material at the outlet of said jet pump for contacting flow of fuel from said jet pump and contacting said fuel filter to complete an electrical circuit for grounding said jet pump.

12. A grounded fuel delivery module as set forth in claim 11 including a fuel pump disposed in said fuel reservoir and adapted to be electrically grounded to an electrical system of the vehicle.

13. A grounded fuel delivery module as set forth in claim 12 wherein said fuel pump has a shell made of a conductive material.

14. A grounded fuel delivery module as set forth in claim 13 including a second grounding member extending between said shell of said fuel pump and said shell of said fuel filter.

15. A grounded fuel delivery module comprising:

a fuel reservoir adapted to be disposed in an interior chamber of a fuel tank;

a fuel filter made of a conductive material disposed in said fuel reservoir;

a jet pump disposed in said fuel reservoir;

a grounding member made of a conductive material at the outlet of said jet pump for contacting flow of fuel from said jet pump and contacting said fuel filter to complete an electrical circuit for grounding said jet pump; and wherein said grounding member has a base and a first leg extending upwardly and inwardly at an angle from said base and a second leg extending downwardly and outwardly at an angle from said base.

16. A grounded fuel delivery module as set forth in claim 15 wherein said second arm has a flange extending downwardly from said second leg to contact said fuel filter.

17. A grounded fuel delivery module as set forth in claim 15 wherein said base has at least one barb for engaging said jet pump.

18. A grounded fuel delivery module as set forth in claim 15 wherein said base is generally circular and split to form a gap between ends thereof.

19. A grounded fuel delivery module as set forth in claim 15 wherein said base has a flange extending radially therefrom with a diameter greater than a diameter of said base.

20. A fuel system for a vehicle comprising:

a fuel tank having an interior chamber;

a fuel reservoir disposed in said interior chamber of said fuel tank;

an electrical fuel pump having a conductive shell disposed in said fuel reservoir to pump fuel therefrom to an engine of the vehicle;

a fuel filter having a conductive shell disposed in said fuel reservoir;

a first ground member extending between said shell of said fuel pump and said shell of said fuel filter;

a jet pump disposed in said fuel reservoir and having a barrel extending upwardly into the interior chamber of said fuel reservoir; and a second grounding member extending over an outlet of said jet pump for contacting flow of fuel from said jet pump and contacting said fuel filter to complete an electrical circuit for grounding said jet pump.

* * * * *